United States Patent

[11] 3,600,613

[72] Inventor William F. Clarke
 Stamford, Conn.
[21] Appl. No. 754,648
[22] Filed Aug. 22, 1968
[45] Patented Aug. 17, 1971
[73] Assignee Branson Instruments, Incorporated
 Stamford, Conn.

[54] TRANSDUCER PROBE FOR ULTRASONIC PULSE-ECHO TEST APPARATUS
 1 Claim, 6 Drawing Figs.
[52] U.S. Cl. .................................................. 310/9.1,
 73/67.8, 310/8.9, 340/10
[51] Int. Cl. ..................................................... H01v 7/00,
 H04r 17/00
[50] Field of Search ........................................... 310/8.4, 9,
 9.1, 9.4, 8.3; 340/10; 73/67, 67.3, 67.8 R, 67.8 S,
 67.6, 67.7, 67.5, 71.5

[56] References Cited
 UNITED STATES PATENTS
2,281,163 4/1942 Lane .............................. 73/67.3
3,190,111 6/1965 Trassell et al. ................. 73/67.5
3,251,221 5/1966 Vogel et al. .................... 73/76.6 X
3,272,000 9/1966 Stebbins ........................ 73/71.5
3,340,953 9/1967 Zemanek, Jr. ................. 73/67.5 UX
3,417,609 12/1968 Graham ......................... 73/71.5
3,425,507 2/1969 Cadwell et al. ................ 73/67.8 S
3,508,436 4/1970 Krautkramer ................. 73/67.5

Primary Examiner—Milton O. Hirshfield
Assistant Examiner—Mark O. Budd
Attorney—Ervin B. Steinberg ABSTRACT: A transducer probe for ultrasonic pulse-echo testing comprises a generally circular elongated body adapted to be inserted into a tubing for being rotated and moved axially during test. The probe mounts one or more ultrasonic transducers and is provided with a set of fixed projections and a set of radially pivotable arms adapted to expand or retract to accommodate changes in tube diameter. In this manner the angle of incidence of the ultrasonic energy impinging on the tube is maintained substantially constant.

WILLIAM F. CLARKE
INVENTOR.

BY:

Ervin B. Steinberg

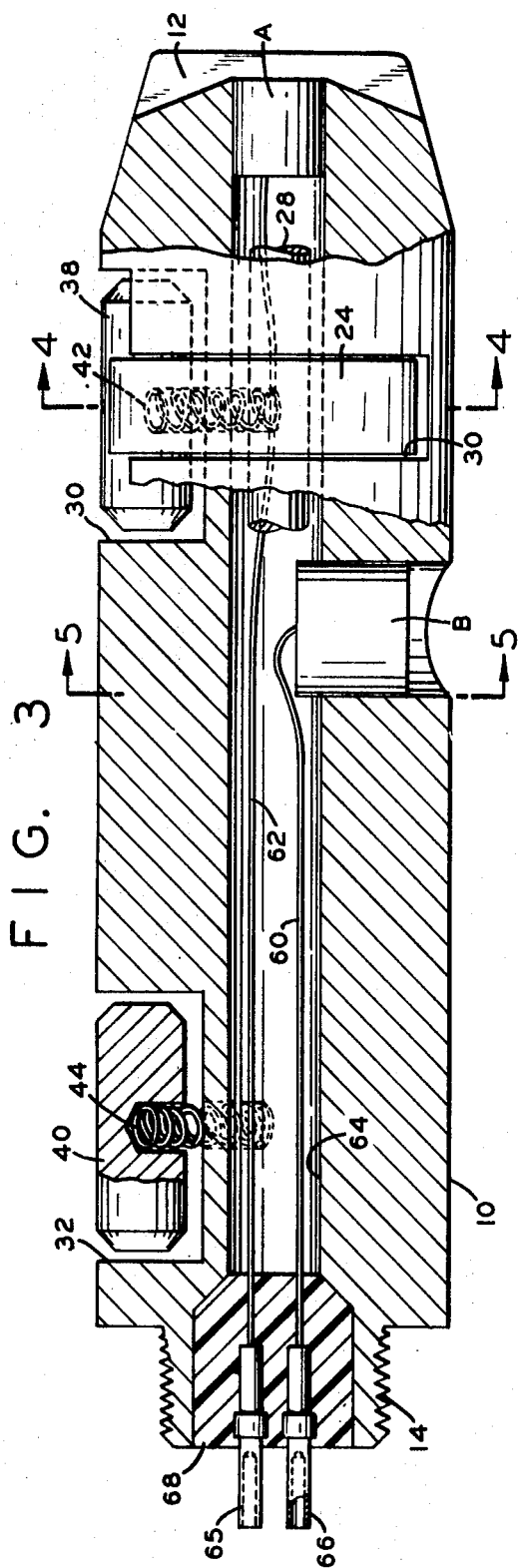
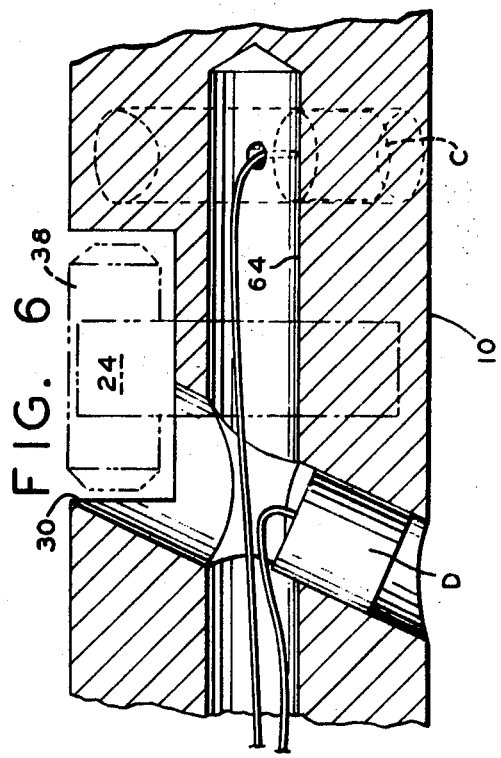
WILLIAM F. CLARKE
INVENTOR.
BY:
Ervin B. Steinberg

TRANSDUCER PROBE FOR ULTRASONIC PULSE-ECHO TEST APPARATUS

This invention refers to a transducer probe for ultrasonic pulse-echo testing and more specifically refers to the construction of such a transducer probe which is adapted to be inserted in a tubing for testing the integrity thereof, particularly a tube forming a part of a condenser, boiler or similar device.

When constructing a condenser for power generation stations or similar purposes, a large quantity of tubes are used which are attached to end plates by means of welding, rolling or other techniques, well known to those skilled in the art. While the tubes originally are of fairly uniform inside dimension, the attachment procedure causes a distortion from the nominal dimension. Therefore, in order to test the soundness of a tube by means of a pulse-echo ultrasonic transducer probe which is rotated and drawn through the inside of the tube, certain provisions must be made to allow for the variations of the inside dimension, specifically the inside diameter of round tubes.

The necessity for the probe to accommodate variations of the inside dimension of the tube is complicated by the requirement that the ultrasonic energy beam propagated from the transducer probe toward the tube wall be incident on the tube surface at a predetermined angle in order to perform the required measurement. For instance, when checking the wall thickness of the tube, the ultrasonic energy beam must strike the tubing precisely along a radial axis. In other cases where shear waves of Lamb waves are to be used for flaw detection, the incident angle is also predetermined and must be maintained despite variations of tube diameter.

The transducer probe construction disclosed hereafter is designed to maintain the desired angle of incidence while allowing for variations of tube diameter. To this end, the ultrasonic probe is provided with a set of fixed projections which are urged in contact with the tubing wall by means of a spring loaded pivotal arm which is adapted to expand and retract relative to the probe body in response to variations of the tube diameter. The ultrasonic energy is propagated from a location disposed between the fixed projections toward the tube wall and, by virtue of the movable arm maintaining the spacing between the fixed projections and the tube wall constant, the angle of incidence of the ultrasonic beam is maintained constant.

One of the principle objects of this invention, therefore, is the provision of a transducer probe for ultrasonic pulse-echo testing adapted to be inserted and drawn through tubings.

Another important object of this invention is the provision of an ultrasonic transducer probe adapted to be inserted in tubes of boilers and condensers, and including means for allowing for changes in diameter of such tubes.

A further important object of this invention is the provision of a transducer probe for insertion into tubings and including means for maintaining a predetermined angle of incidence of the ultrasonic energy beam on the tubing wall.

Further and still other objects of this invention will be more clearly apparent by reference to the following description, when taken in conjunction with the accompanying drawings, in which:

FIG. 3 is a sectional view of the transducer probe taken along line 3-3 in FIG. 2, showing the location of the ultrasonic transducers;

FIG. 6 is a partial view of a transducer probe as shown in FIGS. 1 through 5, except the ultrasonic transducers being mounted in different positions within the transducer probe.

Figure 1:
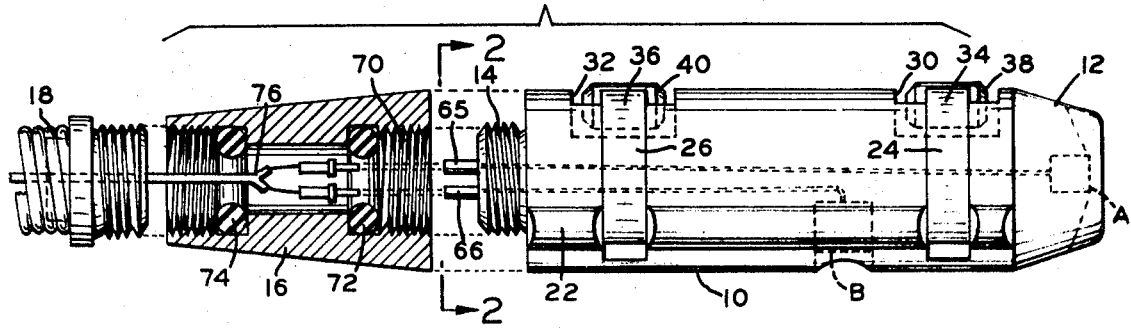
FIG. 1 is a side elevational view partly in section of the novel transducer probe.
Figure 2:
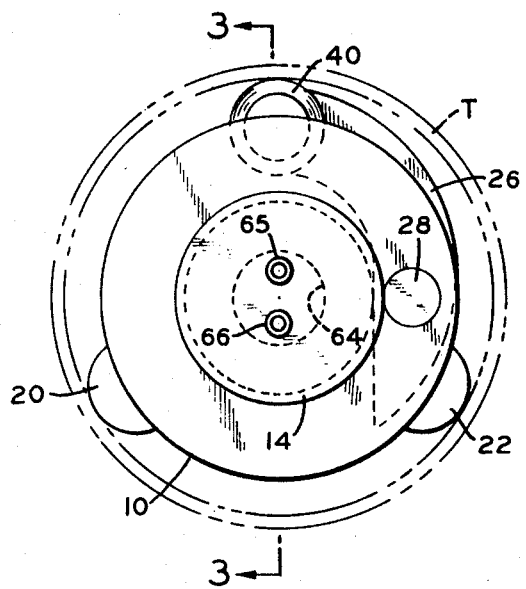
FIG. 2 is a rear end view taken along line 2-2 in FIG. 1.

Referring now to the figures and FIGS. 1 through 5 in particular, numeral 10 identifies an elongated, generally circular, transducer probe which is provided at its front end with a reduced portion, numeral 12, and having a threaded rear portion 14. The threaded rear portion 14 is adapted to receive a connector assembly 16 which, in turn, is adapted to be coupled to a flexible rotating mechanism 18. The entire assembly comprising the probe 10, connector body 16 and rotating mechanism 18 is designed to fit into the inside of a tubing T, as indicated in FIG. 2. The space between the tubing and the transducer probe is filled with a suitable coupling liquid, such as water, and when performing tests the transducer probe is rotated, typically at a speed of several hundred revolutions per minute, and is advanced simultaneously along the longitudinal axis of the tubing. During the combined rotational and longitudinal motion of the transducer probe, one or more ultrasonic transducers mounted in the probe body 10 propagate ultrasonic energy toward the tubing and receive echo signals which are caused by acoustic discontinuities within the tubing in a manner that is well understood in the art of pulse-echo ultrasonic testing.

The transducer probe 10 is a metallic body which is provided with a set of fixed longitudinal projections 20 and 22, see FIGS. 1, 2, 4, and 5, which substantially run along the length of the probe body. The projections are rounded and adapted to engage the inside wall of the tubing T under test, as indicated in FIG. 2. The transducer probe is provided, furthermore, with a set of radially pivoting arms 24, 26. Both arms are mounted for pivotal motion on a common pin 28 which fits into a longitudinal bore of the transducer body 10. The transducer body 10 and projections are provided with the appropriate radial recesses 30, 32 to accommodate the pivotally mounted arms 24, 26.

Figure 4:
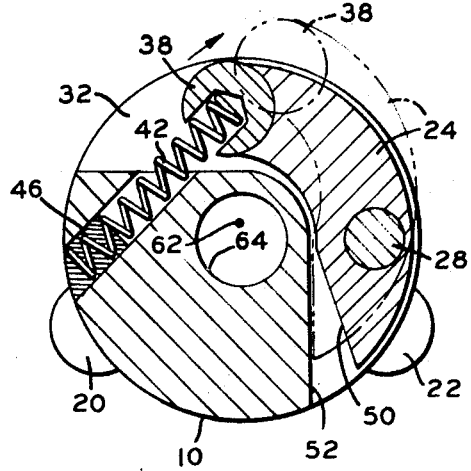
FIG. 4 is a sectional view along line 4-4 in FIG. 3.
Figure 5:
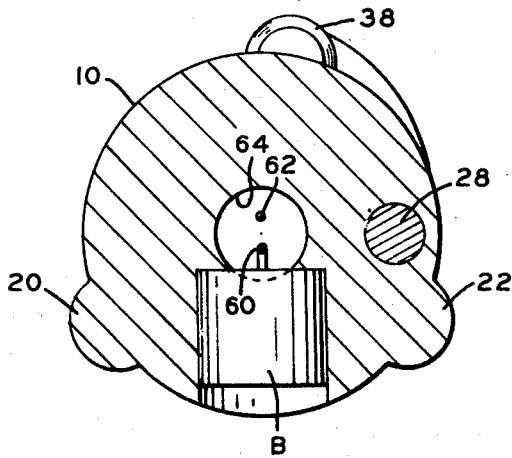
FIG. 5 is a sectional view taken along line 5-5 in FIG. 3.

The respective distal end 34, 36 of each arm is provided with a transverse rail piece 38, 40 which is urged outwardly under the influence of a respective helical compression spring 42 and 44 as is clearly seen in FIG. 4. One end of each spring is retained in a recess of the respective rail piece using, for instance, epoxy resin and the other end is disposed in a respective bore 46 of the body 10 and is retained therein, such as by solder.

As clearly seen in FIG. 4, the distal end of the radial arm is urged outwardly as shown by the dashed lines, however, such outward motion is stopped when the surface 50 of the arm 24 strikes the surface 52 of the transducer probe body. When the transducer probe 10 is inserted in a tubing the arms 24 and 26, under the influence of the respective springs, are driven into engagement with the inside wall of the tubing and this action, in turn, provides intimate contact between the fixed projections 20 and 22 and the inside wall of the tubing T. As the diameter of the tubing T changes due to localized welding or other induced distortions, the arms are adapted to slightly rock about the pin 28, maintaining, however, intimate contact between the fixed projections 20, 22 and the tubing T. It will be noted that the fixed projections and the distal ends of the arms are disposed to engage the tubing diameter at radial spacings of 120° in order to maintain the alignment between the transducer probe and the tubing despite changes of tube diameter.

As shown in FIGS. 1 through 5, the ultrasonic transducer is fitted with two ultrasonic energy transducers A and B respectively. The transducer A is mounted to propagate and receive ultrasonic energy in an axial direction for sensing the presence of a sufficient amount of coupling liquid. The transducer B is mounted along a radial axis for providing ultrasonic energy in a precisely radial direction in order to explore the wall thickness of the tubing T. The transducer B is mounted medially between the fixed projections 20 and 22 so as to maintain the desired angle of incidence of the ultrasonic energy on the tubing wall. Each of the transducers A and B is an assembly which comprises a piezoelectric wafer for converting electrical energy applied to acoustic energy. The transducer assemblies are held in the appropriate recesses by means of epoxy resin. One side of each piezoelectric wafer is connected electrically to the transducer body 10 while the other sides of the respective wafers are connected to an associated electrical conductor 60 and 62, both conductors being fed through a central bore 64 of the transducer body 10. The conductors 60 and 62 terminate in respective connector pins 65 and 66 which are a part of an insulated body 68 inserted in the threaded end of the transducer body and sealing the bore 64 at the back end, see FIG. 3. As shown in FIG. 1, the connector body 16 is fitted with an internally threaded recess 70 which is adapted to mate with the threaded portion 14. A set of O-ring gaskets 72, O-ring is provided in order to prevent the entry of the liquid coupling medium into the electrical connection and into the conductor 76 which establishes via a set of female pins fitting over the pins 65, 66 connection between the electrical circuit (not shown) and the ultrasonic energy transducers A and B.

As indicated by the arrow in FIG. 4 the preferred rotation of the transducer probe, as caused by the drive mechanism 18, is in the clockwise direction so that a reduction in diameter of the tube T pivots the distal end of the respective arms inwardly, compressing the associated springs.

In order to test the tube T with angle beam ultrasonic energy, the same transducer probe construction principle is used, however, the respective recesses for the ultrasonic transducers A and B are machined as is shown schematically in FIG. 6 wherein a pair of transducers C and D is inserted in angular position to induce shear wave or Lamb wave ultrasonic energy in the test piece. A transducer probe per FIG. 6 is adapted to test the tubing for defects which are oriented in the longitudinal and/or radial direction. It will be apparent that for a complete test, the tubing T must be explored with a transducer probe as shown in FIGS. 1 through 5 and a transducer probe per FIG. 6.

It should be noted, moreover, that there is an ultrasonic transducer probe set associated with each nominal tubing size to be tested, that is to say, a separate transducer probe set is required for ½-inch diameter tubing and another one for a ¾-inch diameter tubing, the pivotal motion of the arms being designed to provide only for relatively small changes and deviation from nominal diameter, such as occurs at the locations of tube attachment to an end plate.

What I claim is:

1. An ultrasonic transducer probe for supporting ultrasonic transducer means comprising:
   an elongate body of generally circular cross-sectional area;
   a pair of fixed longitudinal riblike projections extending radially from said body and running along the length of said body;
   a pair of axially spaced radially disposed recesses on said body;
   a pair of arms, one such arm disposed in each of said recesses;
   pin means pivotally fastening one end of each arm to said body within a respective of said recesses;
   spring means disposed between each arm and said body for urging the other and distal end of each arm outwardly away from said body;
   means coating between each arm and recess for limiting the outward motion of a respective arm;
   said arms and projections being located on said body to cause, when said body is disposed in the bore of a round tubing, contact between said respective projections and the respective distal ends of said arms and the tubing wall at radial locations substantially 120° apart;
   means disposed on one end of said body for coupling said body to a mechanical drive means which is adapted to impart axial and rotational motion to said body;
   a first piezoelectric transducer means disposed at the opposite end of said body for propagating an ultrasonic beam in axial direction of said body;
   a second piezoelectric transducer means disposed in said body between said fixed projections and oriented for propagating an ultrasonic energy beam in substantially radial direction toward the wall of said tubing for exploring a portion of the wall, and
   electrical conductor means disposed in said body and establishing electrical circuit connection from said respective transducer means to connector means disposed at said one end of said body.